United States Patent [19]
Ingram

[11] Patent Number: 5,409,147
[45] Date of Patent: Apr. 25, 1995

[54] CANTILEVERED ROTARY VALVE

[75] Inventor: Galen S. Ingram, Muncy, Pa.

[73] Assignee: The Young Industries, Inc., Muncy, Pa.

[21] Appl. No.: 3,414

[22] Filed: Jul. 9, 1993

[51] Int. Cl.⁶ ............................................. G01F 11/00
[52] U.S. Cl. ...................................... 222/368; 222/410
[58] Field of Search ...................... 222/148, 368, 410; 137/15, 315

[56] References Cited

U.S. PATENT DOCUMENTS

| | | | |
|---|---|---|---|
| 3,048,132 | 8/1962 | Morgan et al. | 222/368 |
| 4,059,205 | 11/1977 | Heyl | 222/368 |
| 4,600,032 | 7/1986 | Heyl | 222/368 |
| 4,602,727 | 7/1986 | Jackson | 222/368 |
| 5,002,084 | 3/1991 | Wilson | 222/368 |

Primary Examiner—Andres Kashnikow
Assistant Examiner—Philippe Derakshani
Attorney, Agent, or Firm—Lalos & Keegan

[57] ABSTRACT

A rotary valve generally consisting of a housing having a rotor chamber provided with inlet and outlet openings and an end access opening, a drive shaft journaled in the housing having an end section extending into the rotor chamber toward the end access opening, such shaft end section having a plane, torque transmitting surface, a rotor having an axial, cylindrical opening receiving the shaft end section, a plurality of circumferentially spaced pockets for receiving material from the inlet opening and discharging such material through the outlet opening and a plane, torque transmitting surface cooperable with the torque transmitting surface of the drive shaft end section, when the rotor is inserted through the end access opening into the rotor chamber, the rotor being freely slidable onto and off of the drive shaft end section, in the rotor chamber and through the end access opening, and a cover plate for the end access opening detachably secured to the housing.

21 Claims, 2 Drawing Sheets

CANTILEVERED ROTARY VALVE

This invention relates to rotary valves and more particularly to a cantilevered rotary valve which may be quickly and easily disassembled and reassembled for cleaning, maintenance and other purposes.

In the chemical, pharmaceutical and food processing industries, a type of valve commonly referred to as a cantilevered rotary valve is used extensively to feed or meter bulk materials. Generally, such type of valve consists of a housing provided with a rotor chamber having material inlet and outlet openings and an access opening, a drive shaft journaled in the housing and having an end portion projecting into the rotor chamber, a rotor insertable through the access opening in the housing onto the cantilevered portion of the drive shaft, having a plurality of circumferentially spaced pockets registrable with the inlet and outlet openings for conveying and thereby feeding or metering bulk material as the rotor is rotated, and a detachable cover plate mountable across the access opening to close the rotor chamber. With such type of valve, in many applications, it is required or desirable to periodically clean the rotor to remove material lodged in the pockets thereof to prevent product contamination or deterioration and particularly cross contamination when different products are processed. Such cleaning operations may be performed simply by removing the cover plate on the valve housing, detaching the rotor from the drive shaft and sliding the rotor off of the cantilevered portion of the drive shaft, through the access opening. The rotor may then be cleaned by the operator and reinserted in the rotor chamber to place the valve back into service.

Often, such valves are installed at locations within processing plants that are not easily accessible by maintenance personnel. They may be installed in cramped quarters or at some high elevation which makes it difficult for maintenance personnel to readily disassemble the valve, clean the rotor and reassemble the valve. It thus has been found to be desirable to provide a valve of the type described having a construction which will facilitate its disassembly and reassembly for cleaning, maintenance and other purposes.

Accordingly, it is the principal object of the present invention to provide an improved rotary valve.

Another object of the present invention is to provide an improved cantilevered rotary valve.

A further object of the present invention is to provide an improved cantilevered rotary valve which may be readily disassembled for cleaning, maintenance and other purposes and then reassembled.

A still further object of the present invention is to provide an improved cantilevered rotary valve which may be quickly and easily disassembled, cleaned and reassembled with minimum manual effort.

Another object of the present invention is to provide an improved cantilevered rotary valve which is adapted to be quickly and easily disassembled, cleaned and reassembled, even when located in areas providing difficult access.

A further object of the present invention is to provide an improved cantilevered rotary valve which is simple in design, comparatively inexpensive to manufacture, highly effective in performance and easy to maintain.

Other objects and advantages of the present invention will become more apparent to those persons having ordinary skill in the art to which the present invention pertains from the following description taken in conjunction with the accompanying drawings wherein.

Figure 1:
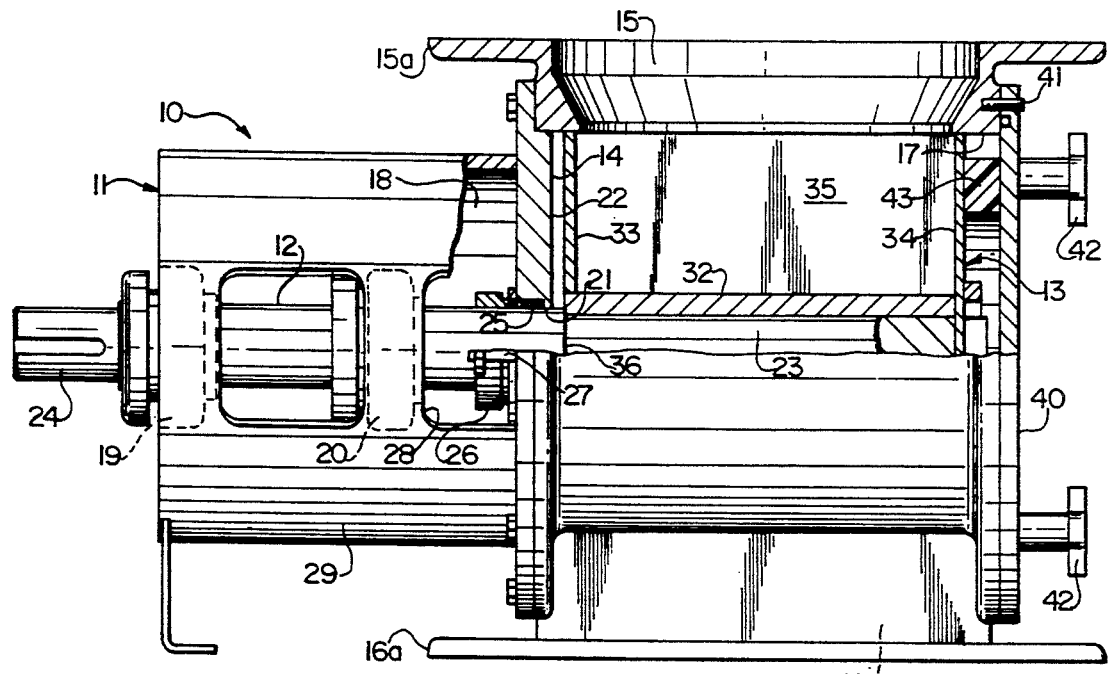
FIG. 1 is a side elevational view of a cantilevered rotary valve embodying the present invention, having a portion thereof broken away.
Figure 4:
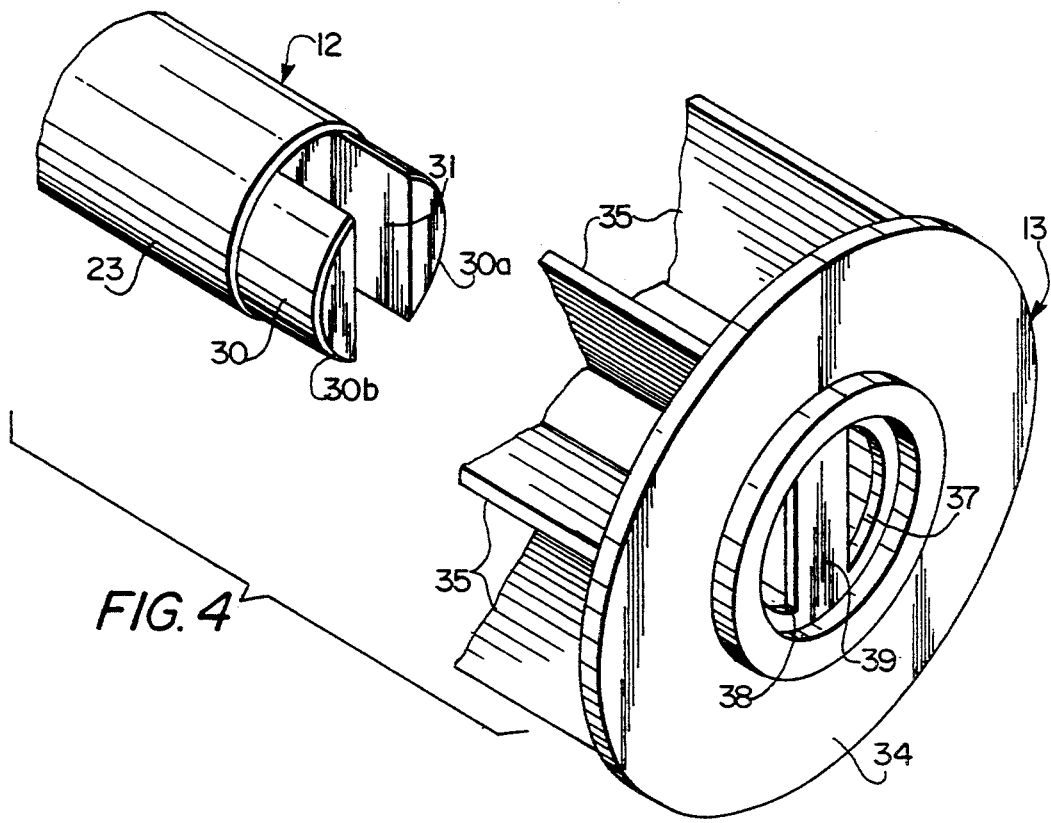
Figure 5:
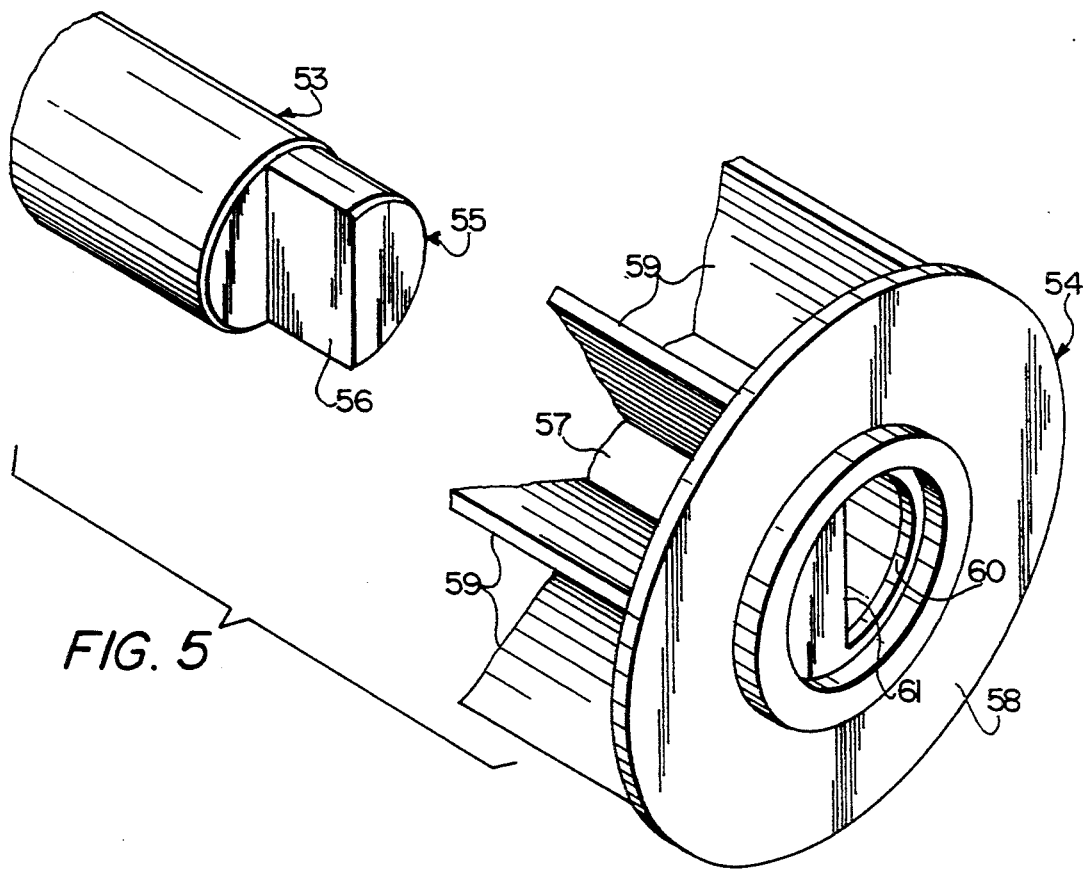

FIG. 4 is an enlarged, perspective view of the cantilevered portion of the drive shaft and the rotor of the valve shown in FIG. 1, illustrating such components in exploded relation and having portions thereof broken away; and FIG. 5 is a view similar to the view shown in FIG. 4, illustrating another means of transmitting torque from the drive shaft to the rotor within the scope of the present invention.

Referring to FIG. 1, there is shown a cantilevered rotary valve 10 generally consisting of a housing 11, a drive shaft 12 and a rotor 13. The housing is provided with a rotor chamber 14 having a material inlet opening 15, a material outlet opening 16 and an access opening 17. The inlet and outlet openings may be formed with circular or rectangular cross-sections depending on the application and function to permit the gravity feed of bulk materials into the valve and the discharge of such material therefrom.

Mounted on a pair of transverse walls in a compartment 18 of the housing is a pair of bearings 19 and 20. Drive shaft 12 is journaled in such bearings, having a mid-section thereof passing through an opening 21 in a transversely disposed housing wall 22 forming a partition between compartment 18 and rotor chamber 14, an end section 23 projecting into the rotor chamber toward access opening 17 and an end section 24 projecting out of the housing. Opening 21 in partition wall 22 is provided with an enlarged section for receiving an annular packing 25 therein. The packing is compressed by a follower 26 to provide a fluid tight seal between the rotatable drive shaft and stationery partition wall 22 in the conventional manner. Follower 26 is provided with an opening therein for receiving the drive shaft therethrough and includes an annular portion 27 engageable with the packing to compress it, and a pair of radially disposed arm portions having a set of bolts extending through openings therein and threaded into wall member 22 for urging the follower against the packing, causing it to expand and form the seal between the drive shaft and the housing. Access to the follower for manipulating the bolts and axially displacing the follower is provided by means of a pair of access openings 28 in cylindrical housing wall 29.

As best shown in FIG. 4, end portion 30 of shaft section 23 is provided with a diametrically disposed slot 31 which cooperates with a portion of the rotor for transmitting torque from the shaft to the rotor. Shaft end section 24 is adapted to be operatively connected to a motor through a gear reducer in the conventional manner to drive the shaft and rotate the rotor mounted on shaft section 23.

Rotor 13 includes a cylindrical member 32, an inner annular shroud 33, an outer circular shroud 34 and a plurality of rectangular vanes 35. Cylindrical member 32 is provided with an inside diameter equal to or slightly greater than the diameter of shaft end section 23 so that the rotor may be easily inserted or removed through access opening 17 onto and off of shaft section 23. When the rotor is in operating position as shown in FIG. 1, the inner end portion of cylindrical member 32 will abut an annular abutment surface 36 on shaft 12 so that as the rotor is rotated, the pockets of the rotor will register with inlet opening 15 and outlet opening 16 to receive and discharge material through the valve.

As best shown in FIG. 4, outer shroud 34 is provided with a pair of diametrically spaced openings 37 and 38 providing a diametrically disposed shroud portion 39. Openings 37 and 38 have cross-sectional configurations similar to the cross-sectional configurations of projecting end portions 30a and 30b of shaft 12 so that when the rotor is mounted on the shaft as previously described and the rotor is properly oriented relative to the shaft, projecting shaft portions 30a and 30b will be received through shroud openings 37 and 38, respectively, and shroud portion 39 will be received within slot 31 of the drive shaft. With such a mounting of the rotor on the shaft, it will be appreciated that torque will be transmitted through projecting shaft portions 30a and 30b to shroud portion 39 to rotate the shaft. It further will be appreciated that the construction of such a connection not only would be effective to transmit torque from the drive shaft to the rotor but also to permit the rotor to be easily mounted on and removed from the shaft end section merely by having the rotor oriented properly with the shaft and axially displacing the rotor. There is no threaded, keyed or other similar type of fastening connection which otherwise might complicate or impede the rapid and effortless mounting and removal of the rotor with respect to the drive shaft.

Access opening 17 is closed with a circular, detachable cover plate 40. The cover plate may be aligned with the access opening and supported in position by means of an alignment pin 41 provided in the housing above the access opening which is adapted to be received within an alignment opening in the cover plate. The cover plate is adapted to be secured in position by means of four circumferentially spaced hand knobs 42 having threaded portions passing through openings in the cover plate and threaded into tapped holes provided in the housing about the periphery of the access opening. Mounted on the interface of the cover plate and disposed concentrically therewith is an annular spacer member 43 which is adapted to be disposed adjacent outer shroud 34 of the rotor when the valve is in the fully assembled condition to prevent axially displacement of the rotor in operation.

The housing of the valve shown in FIG. 1 may be of a cast metal construction, a fabricated metal construction or a combination cast and fabricated metal construction. The drive shaft preferably is of a steel construction with slot 31 in end section being milled. The rotor may be of a cast or fabricated metal construction and the cover plate also may be of a fabricated metal construction. Preferably, annular spacer member 43 is formed of a composite material having good wear and heat resistant properties such as nylon, and may be adhesively secured to the cover plate. The metal components of the valve may be formed of steel or aluminum depending upon the particular application of the valve.

In the assembly of the valve as described, bearings 19 and 20 are first seated in position on the shaft. The drive shaft is then inserted into the housing with the packing gland and follower positioned thereon so that the mid portion of the shaft extends through opening 21 of housing wall 22, shaft end section 23 projects into rotor chamber 14 in a cantilevered manner, a section of the shaft is journaled in the bearings and shaft end section 24 is disposed exteriorally with respect to the housing. The packing gland is then inserted in the annular space between the shaft and housing wall 22 and compressed by follower 27 to form a fluid tight seal between housing wall 22 and the drive shaft. Access to the securing bolts of follower 26 is provided through openings 28 of housing section 29.

With cover plate 40 having been removed, the rotor may be placed onto shaft end section 23 simply by inserting the rotor through the access opening onto the cantilevered shaft end section, registering shroud section 39 with slot 31 in the end of the drive shaft and then fully inserting the rotor in the rotor chamber so that the rotor engages annular abutment surface 36. The assembly may then be completed by placing the cover plate across the access opening with the aid of alignment pin 41, properly aligning the screw portions of the hand knobs with the tapped holes in the housing and turning the hand knobs to tighten the cover plate against the housing. When the cover plate is positioned tightly against the housing, spacer member 43 will be spaced adjacent outer shroud 34 to prevent axially displacement of the rotor when it is rotated by the drive shaft. The valve is then in condition to be placed in a system and operatively connected to a drive motor by means of mounting flanges 15a and 16a to receive and discharge comminuted material. The valve may be connected to a component such as a gravity blender or a filter-collector for receiving and feeding bulk material into another component or a transport line perhaps of a pneumatic conveying system.

Whenever it is desired to remove the rotor from the valve for cleaning, maintenance, replacement or other purposes, all that need be done is to turn hand knobs 42 to detach the cover plate, remove the detached cover plate away from the access opening and merely reach through the access opening and slide the rotor off of the shaft end section through the access opening. The particular torque transmitting connection between the drive shaft and the rotor permits the rotor to be easily slid off of the shaft end section without the necessity of manipulating any complicated mechanism to free the rotor from the shaft. The rotor can then be serviced and replaced in the valve or a similar replacement rotor may be installed simply by sliding the rotor through the access opening onto the shaft end section while properly aligning the rotor with the shaft so that shroud portion 39 is received within slot 31 in the end of the drive shaft. With the rotor thus properly positioned, the cover plate can be re-attached and the valve will thus be in condition to be placed back into service.

Figure 2:
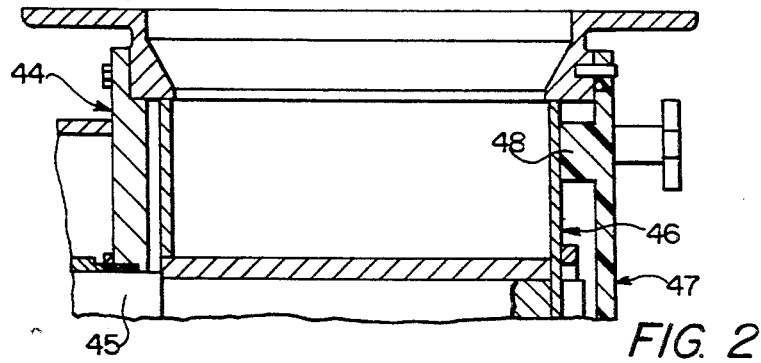
FIG. 2 is a vertical cross-sectional view of another embodiment of the present invention, having a portion thereof broken away.

FIG. 2 illustrates a modification of the valve shown in FIG. 1 and is similar thereto in most respects with the exception of some of the components being formed of different materials. The valve includes a housing 44 similar to housing 11, a shaft 45 similar to shaft 12, a rotor 46 similar to rotor 35 and a cover plate 47. The cover plate is similar to cover plate 40 except that it is formed of a plastic composite material having an inwardly facing, annular spacer portion 48 formed integrally therewith. The cover plate may be formed of any plastic or composite material having sufficient strength, wear resistant and heat resistant properties such as nylon. Similar to the function of spacer member 43, spacer portion 48 functions to prevent the axially displacement of rotor 46 as it rotates to meter material through the valve.

Figure 3:
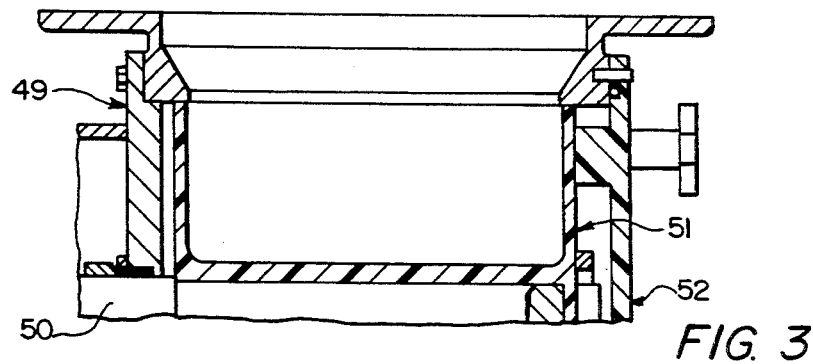
FIG. 3 is a vertical cross-sectional view of a still further embodiment of the present invention, having a portion thereof broken away.

FIG. 3 illustrates a further modification of the valve shown in FIG. 1 and includes a housing 49 similar to housing 11, a drive shaft 50 similar to drive shaft 12, a rotor 51 mounted on an end section of the drive shaft and a cover plate 52 similar to cover plate 47. Rotor 51 is formed of a lightweight, plastic or composite material such as nylon and may be of a molded and/or machined construction.

With a rotor formed of aluminum as may be provided for in the valve shown in FIG. 2 or of a lightweight plastic or composite material as provided for in the valve shown in FIG. 3, it will be appreciated that the removal and replacement of the rotors of such valves is greatly facilitated. This particularly can be advantageous in installations where the valves may not be easily accessible such as in elevated locations or in confined spaces where the operator has limited maneuverability. Lightweight rotors permit maintenance personnel to easily remove, service and replace the rotor in a minimum amount of time and with a minimum amount of effort.

FIG. 5 illustrates a further embodiment of the invention providing an alternate type of connection between the drive shaft and the rotor for transmitting torque. Such embodiment includes a drive shaft 53 and a rotor 54 mountable on the end of the drive shaft similar to the previously described embodiments of the invention. The drive shaft is provided with a reduced end section 55 having a milled off portion providing a plane surface 56. Although surface 56 is shown in FIG. 5 as passing through the axis of the drive shaft and thus being disposed diametrically, the plane of such surface need only intersect the cylindrical surface of end section 55 so as to engage a cooperating surface on the rotor for transmitting torque therebetween. The intersection of a plane of such surface with a plane disposed of perpendicular to the axis of the drive shaft may form a secant to provide an appropriate set of abutment surfaces for transmitting torque.

Rotor 54 is similar to rotor 13 and includes a cylindrical member 57, an inner annular shroud (not shown) and a spaced, outer shroud 58 secured to the cylindrical member and a plurality of vanes 59 secured to the cylindrical member and interconnecting the shroud members. Shroud member 58 is provided with an opening 60 having substantially the same cross-sectional configuration as reduced end section 55 so that when rotor 54 is mounted on drive shaft 53, reduced end section 55 will be received through opening 60 and abutment surface 56 will ,engage and cooperate with edge surface 61 of opening 60 to transmit torque to the rotor. With milled surface 56 being disposed parallel with the axis of the drive shaft, the connection between the drive shaft and the rotor not only permits the transmission of torque between the drive shaft and the rotor when the rotor is mounted on the drive shaft but further permits the removal and replacement of the rotor simply by axially displacement of the rotor relative to the drive shaft. Essentially, all that need be provided for the connection between the drive shaft and the rotor is a set of cooperating, plane surfaces on the shaft and the rotor disposed parallel to the axis of the shaft.

As in the previous embodiments of the invention, the rotor may be formed of a metal such as steel and aluminum and may be of a cast or fabricated construction, and also may be formed of a composite material such as nylon. Rotors formed of lightweight metal such as aluminum and of composite materials provide a lighter weight rotor which may be more easily manipulated during cleaning, maintenance, replacement or other operations.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A rotary valve comprising:
   a housing having a rotor chamber provided with inlet and outlet openings and an end access opening;
   a drive shaft journaled in said housing, having an end section extending into said rotor chamber towards said end access opening, said shaft end section having a torque transmitting surface;
   a rotor having an axial, cylindrical opening receiving said shaft end section, a plurality of circumferentially spaced pockets for receiving material from said inlet opening and discharging said material through said outlet opening and a torque transmitting surface engageable with said torque transmitting surface of said drive shaft end section, when said rotor is inserted through said end access opening into said rotor chamber, said rotor being freely slidable onto and off of said drive shaft end section, in said rotor chamber and through said end access opening;
   a cover plate for said end access opening detachably secured to said housing and
   wherein said cover plate is formed with an annular spacer member engageable with said rotor for restraining said rotor from axial displacement.

2. A rotary valve according to claim 1 wherein said housing, rotor and cover plate are formed of metal.

3. A rotary valve according to claim 1 wherein said housing and cover plate are formed of metal and said rotor is formed of a plastic material.

4. A rotary valve according to claim 1 wherein said housing is formed of a metal and said rotor and cover plate are formed of plastic.

5. A rotary valve according to claim 2 wherein said spacer member is formed of plastic.

6. A rotary valve according to claim 5 wherein said spacer member is adhesively secured to said cover plate.

7. A rotary valve according to claim 2 wherein said spacer member is formed of nylon.

8. A rotary valve according to claim 3 wherein said spacer member is formed of plastic.

9. A rotary valve according to claim 1 wherein said spacer member is adhesively secured to said cover plate.

10. A rotary valve according to claim 3 wherein said spacer member is formed of nylon.

11. A rotary valve according to claim 1 wherein said housing and rotor are formed of metal and said cover plate and spacer member are formed of plastic.

12. A rotor valve according to claim 11, wherein said spacer member is adhesively secured to said cover plate.

13. A rotary valve according to claim 11 wherein said spacer member is formed integrally with said cover plate.

14. A rotary valve according to claim 1 wherein said housing is formed of metal and said rotor, cover plate and spacer member are formed of plastic.

15. A rotary valve according to claim 16 wherein said spacer member is adhesively secured to said cover plate.

16. A rotary valve according to claim 1 wherein said spacer member is formed integrally with said cover plate.

17. A rotary valve according to claim 1 wherein said torque transmitting surface of said drive shaft end section is planar and disposed parallel to the axis of said shaft.

18. A rotary valve according to claim 1 wherein an end portion of said drive shaft is provided with a diametrically disposed slot providing a pair of longitudinally disposed, spaced protruding portions, and said rotor includes a pair of longitudinally disposed, spaced openings in which said protruding portions of said shaft are received when said rotor is inserted through said access opening and mounted onto said drive shaft end section within said rotor chamber.

19. A rotary valve according to claim 1 wherein said rotor includes a cylindrical section slidable onto said drive shaft end section, and an outer shroud having a pair of diametrically opposed openings longitudinally registrable with a cylindrical bore of said rotor cylindrical section, and an end portion of said drive shaft is provided with a diametrically disposed slot providing a pair of longitudinally disposed, spaced protruding portions receivable in said shroud openings when said rotor is inserted through said access opening and mounted onto said drive shaft end section within said rotor chamber.

20. A rotary valve comprising:
a housing having a rotor chamber provided with inlet and outlet openings and an end access opening;
a drive shaft journaled in said housing, having an end section extending into said rotor chamber towards said end access opening, said shaft end section having a torque transmitting surface;
a rotor having an axial, cylindrical opening receiving said shaft end section, a plurality of circumferentially spaced pockets for receiving material from said inlet opening and discharging said material through said outlet opening and a torque transmitting surface engageable with said torque transmitting surface of said drive shaft end section, when said rotor is inserted through said end access opening into said rotor chamber, said rotor being freely slidable onto and off of said drive shaft end section, in said rotor chamber and through said end access opening;
a cover plate for said end access opening detachably secured to said housing; and
wherein an end portion of said drive shaft is provided with a diametrically disposed slot providing a pair of longitudinally disposed, spaced protruding portions, and said rotor includes a pair of longitudinally disposed, spaced openings in which said protruding portions of said shaft are received when said rotor is inserted through said access opening and mounted onto said drive shaft end section within said rotor chamber.

21. A rotary valve comprising:
a housing having a rotor chamber provided with inlet and outlet openings and an end access opening;
a drive shaft journaled in said housing, having an end section extending into said rotor chamber towards said end access opening, said shaft end section having a torque transmitting surface;
a rotor having an axial, cylindrical opening receiving said shaft end section, a plurality of circumferentially spaced pockets for receiving material from said inlet opening and discharging said material through said outlet opening and a torque transmitting surface engageable with said torque transmitting surface of said drive shaft end section, when said rotor is inserted through said end access opening into said rotor chamber, said rotor being freely slidable onto and off of said drive shaft end section, in said rotor chamber and through said end access opening;
a cover plate for said end access opening detachably secured to said housing; and
wherein said rotor includes a cylindrical section slidable onto said drive shaft end section, and an outer shroud having a pair of diametrically opposed openings longitudinally registrable with a cylindrical bore of said rotor cylindrical section, and an end portion of said drive shaft is provided with a diametrically disposed slot providing a pair of longitudinally disposed, spaced protruding portions receivable in said shroud openings when said rotor is inserted through said access opening and mounted onto said drive shaft end section within said rotor chamber.

* * * * *

UNITED STATES PATENT AND TRADEMARK OFFICE
CERTIFICATE OF CORRECTION

PATENT NO. : 5,409,147
DATED : April 25, 1995
INVENTOR(S) : Galen S. Ingram

It is certified that error appears in the above-identified patent and that said Letters Patent is hereby corrected as shown below:

Column 7,

In Claim 15, line 1, delete "16" and insert therefor -- 14 --.

In Claim 16, line 1, delete "1" and insert therefor -- 14 --.

Signed and Sealed this

Twenty-seventh Day of June, 1995

*Attest:*

BRUCE LEHMAN

*Attesting Officer*    Commissioner of Patents and Trademarks